INVENTOR.
MEADE F. MOORE
WILLIAM CHRISTENSEN
BY
ATTORNEY

April 23, 1957 M. F. MOORE ET AL 2,789,794
AIR CONDITIONING SYSTEM
Filed Sept. 30, 1953 4 Sheets-Sheet 4

INVENTOR.
MEADE F. MOORE
WILLIAM CHRISTENSEN
BY
Carl J. Barbee
ATTORNEY

United States Patent Office

2,789,794
Patented Apr. 23, 1957

2,789,794

AIR CONDITIONING SYSTEM

Meade F. Moore, Birmingham, and William Christensen, Detroit, Mich., assignors to American Motors Corporation, a corporation of Maryland Application September 30, 1953, Serial No. 383,276

5 Claims. (Cl. 257—7)

This invention relates to air conditioning means for automobiles and has as a general object to provide an air conditioner capable of supplying fresh, conditioned air to the occupants of an automobile.

The primary object of this invention is to provide an air conditioning unit to condition and distribute air in an automobile to provide maximum comfort to the driver and passengers thereof either by cooling or heating the ventilating air, depending upon the season of the year, and irrespective of the prevailing temperature exteriorly of said automobile.

A further object of this invention is to provide a combined air heating or cooling device of compact design which is mounted on a fixed portion of an automobile adjacent the dash panel of the automobile for easy distribution of air for heating or cooling purposes without interference with the vision of the driver or other car occupants.

Another object of this invention is to provide an air conditioning unit of unitary construction to insure the provision of sufficient air to the passenger compartment of the automobile which is in a fresh and wholesome condition and which may be heated or cooled depending upon the desire of the occupants of the car.

The applicants are aware of the heretofore attempts to condition the air in the interior of an automobile to insure comfort for the occupants of an automobile. The greatest majority of attempts have been confined to the provision of individually operated heating devices and ventilating systems. There have also been developments in individually operated devices to cool the interior of an automobile by refrigerating means some of which devices have met with varying degrees of success. The present invention, however, contemplates combining a heating and cooling device in one compact unit to insure both successful heating and cooling of an automobile.

The applicants provide an air conditioning unit mounted adjacent the dash panel of an automobile which includes, in one compact unit, a heater core, an evaporator, a blower, and means for defrosting the windshield. In addition to the above, the applicants provide, remote from said unit, a dehydrator filter, a compressor, a solenoid valve, a condenser, and a receiver.

A further object of this invention is to generally improve upon prior structures of the general type by providing an arrangement characterized by appreciable refinements and structural improvements.

The several objects, advantages, and novel details of construction of the invention will be made more apparent as this description proceeds, especially when considered in connection with the accompanying drawings, wherein:

Figure 1a is a circuit diagram showing the particular electrical arrangement for energizing or de-energizing the solenoid valve used with our invention.

Figure 1:
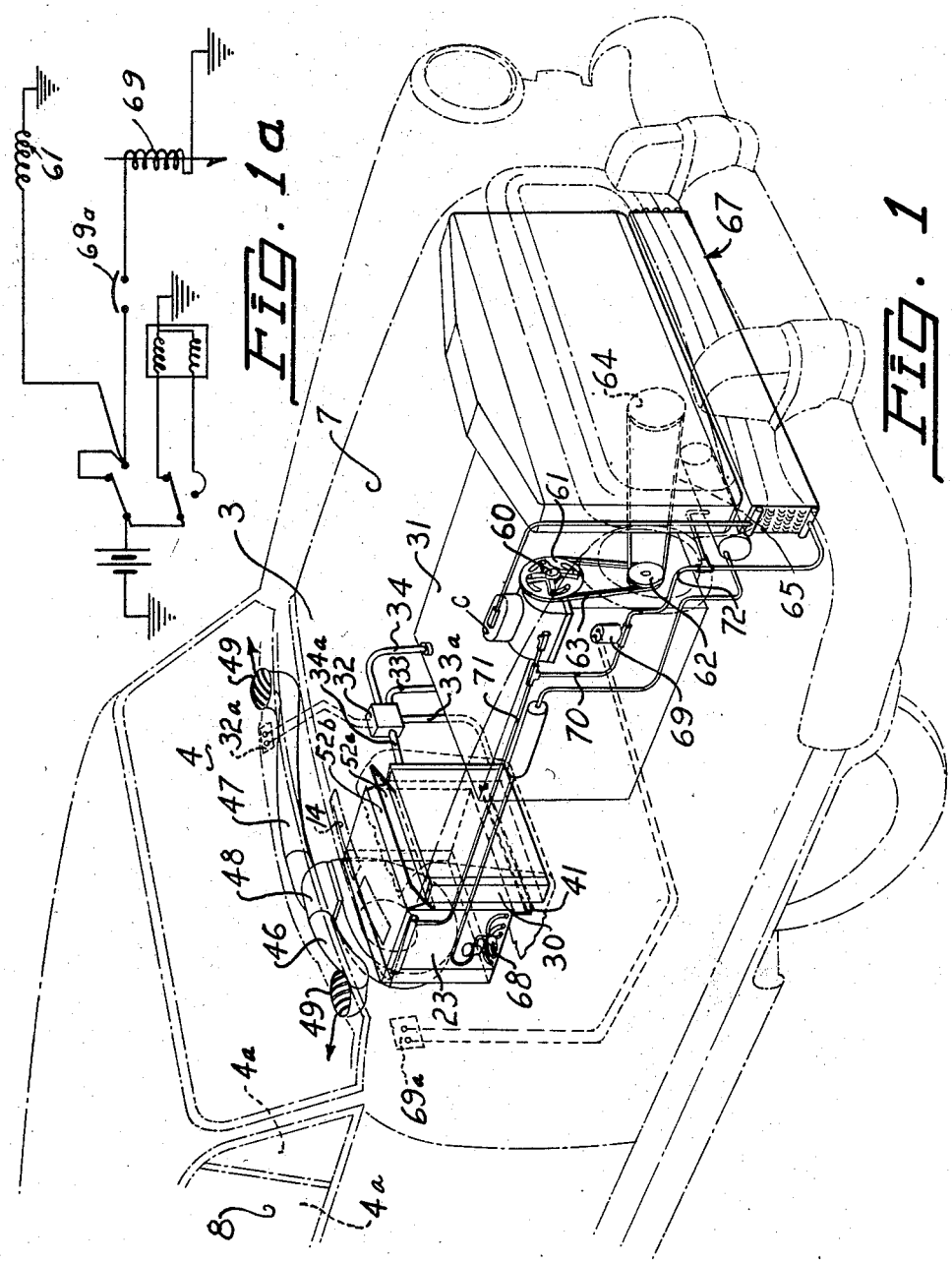
Figure 1 is a schematic view of the parts making up our invention arranged in their order of installation.

Referring now more particularly to the drawings wherein like reference characters indicate like parts, the invention consists generally of a cowl 2 which may be attached to the cross ledge 3 of the vehicle body immediately in front of windshield 4. The cowl 2 has an opening 5 which provides an entry for incoming outside air either by virtue of ram pressure when the automobile is moving forward or by forced convection when the motor 42 is operating, either in the instance of cooling or heating.

A primary panel member 6 extends across the width of the vehicle separating the engine compartment 7 from the interior 8 of the vehicle. On the engine compartment side of the panel member 16 is upper section 9a which serves as the rear wall of an enclosure, generally referred to as 10, into which enclosure the incoming air which enters through cowl opening 5 is initially received. The cross ledge 3 has a forward wall 11 which extends forwardly for some distance and then terminates with a lip 12 at its bottom and which extends crosswise of the vehicle. The cross ledge 3 has air inlet openings 14 spaced intermittently throughout most of the length of the ledge.

The floor of the enclosure 10, designated by the numeral 17, is provided with a large elongated opening 18 through which the air passes so as to continue through the remainder of the system. It will be noted that the air entering opening 5 first strikes the wall 9a from whence it is deflected toward and through opening 18. On a rainy day, water entering opening 5, along with the air, strikes wall 9a and accumulates to some extent in the rear half 19 of floor 17 of enclosure 10, being restrained from entering opening 18 by means of a retaining wall 19a, and is immediately discharged through openings 20 and discharge pipes 20a in the floor 19. The rain water which is discharged through said openings then travels down the panel member 6 on the engine compartment side and does not accompany the air through opening 18 since the discharge openings are large enough to prevent any accumulation of water sufficient to cause the water level within enclosure 10 to reach the uppermost edge of retaining wall 19a.

A box-like retainer 21 may be secured to panel member 6 on the passenger compartment side in any suitable manner. The retainer houses the lower portion of an evaporator or cooling coils 23. Immediately in front of said evaporator unit 23 and spaced therefrom and arranged in the engine compartment of said automobile is a second box-like structure 24 comprised of parallel side walls 24a and 24b having marginal flanges 24c and 24d which are secured to the panel member 6. The floor 17 serves as a roof in cooperation with side walls 24a and 24b to complete the open faced enclosure 24 which houses most of the heat radiating core 30 as well as the upper portion of the evaporator unit. A cover 25 may be secured to the marginal flange 26 of structure 24 to complete the overall "totally enclosed" compartment on the engine side of panel 6. The filter unit 28 is removably held in place between the mating marginal flanges on cover 25 and housing 24 in any suitable and well known manner. Heated water from the circulating system of the vehicle engine 31 enters the radiator core 30 through a thermostatically controlled valve 32 by means of the feed and return conduits 33 and 34. The manner of controlling the flow of heated water through the heat radiating core is conventional and consists briefly of a temperature responsive switch 32a mounted within the passenger compartment which controls the valve 32, which in turn either opens or closes off the flow of heated water through the heat radiating core 30 via the feed and return pipes 33a and 34a.

The utilization of either the heating unit or the cooling unit is selective as will be fully set forth hereinafter. Referring to Figure 1 we have shown a damper assembly 52 which is manually controlled by means of an operating rod 59. The cross rod 59 may be pivotally carried at its opposite ends by the side walls 24a and 24b. This damper assembly is of such size as to completely close off entrance of incoming air to the heater core or to the upper portion of the evaporator, depending solely upon the condition which is desired in the interior of the automobile.

Figure 2:
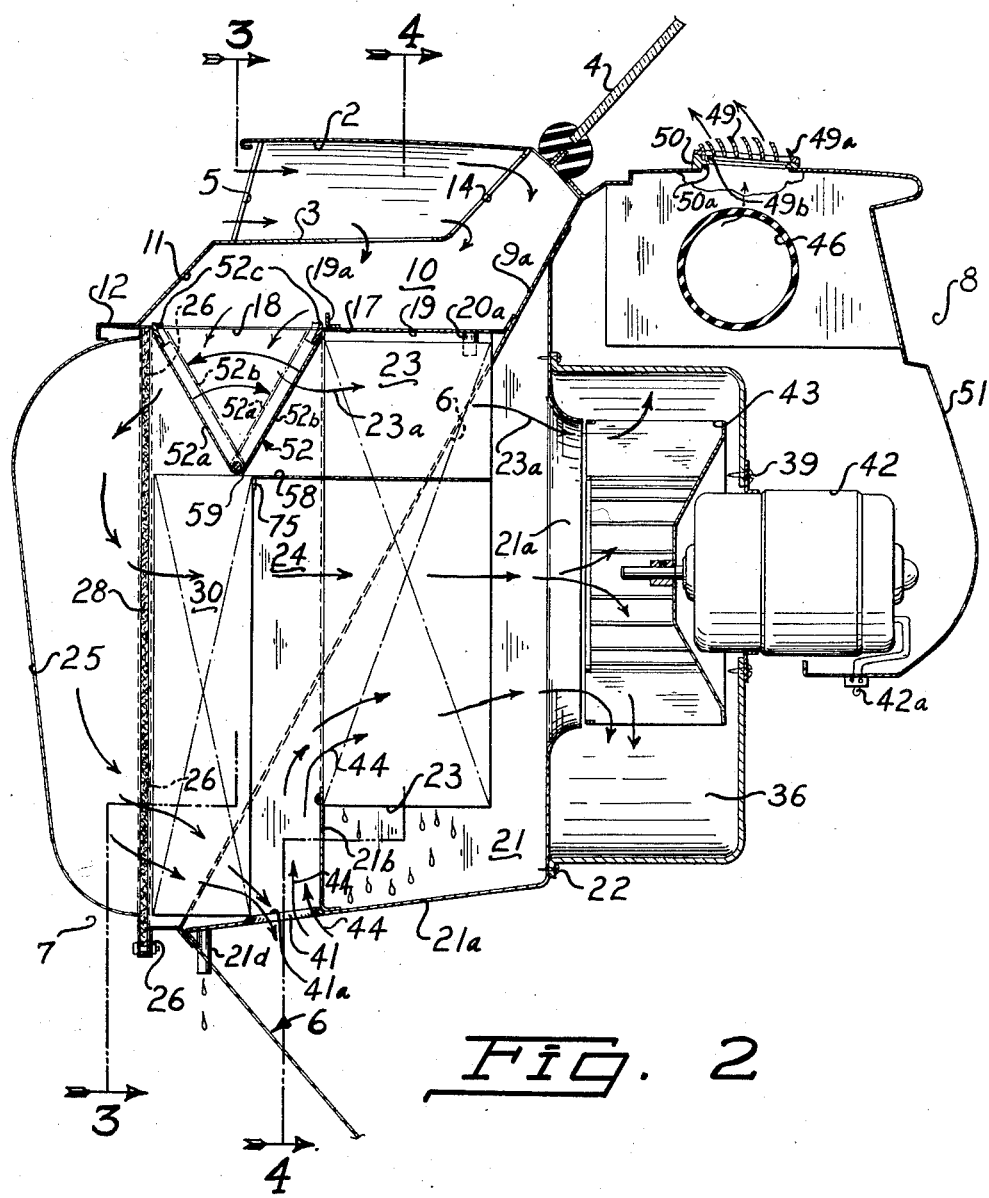
Figure 2 is an enlarged sectional view of the heater and cooler apparatus of the system shown in Figure 1.
Figure 3:
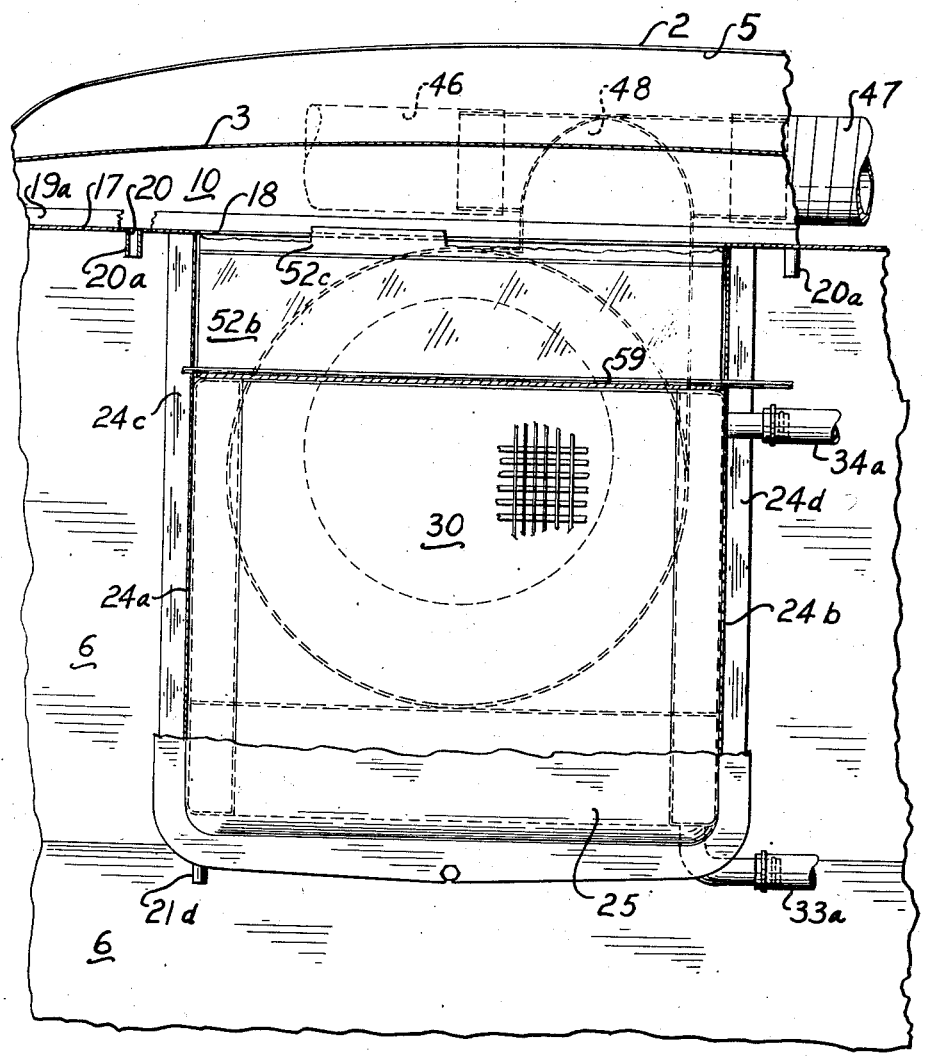
Figure 3 is a fragmentary detail view taken on the line 3—3 of Figure 2.

The damper assembly includes two dampers 52a and 52b which may be brought together in the manner of a single damper as illustrated in dotted lines in Figure 2.

Referring to Figure 2, with damper 52a positioned as shown, if damper 52b were swung over against damper 52a, as shown in dotted lines, then atmospheric air entering opening 5 would proceed through openings 14 and thence through opening 18, where such air would strike against the rear face of damper 52b and be deflected toward and through the upper portion of the evaporator unit 23, as indicated by arrows 23a. A partition wall 58 which may be in the form of a flat sheet of metal is built into the evaporator unit 23 and separates the upper portion of such evaporator unit from the lower portion thereof and the partition wall may continue outwardly beyond the front face of the evaporator unit into contact at 75 with the upper marginal edge of the heat radiating core 30. Thus when the damper 52b is swung over against damper 52a, as described immediately above, then the incoming atmospheric air is confined to the air route which is indicated by the arrows 23a. The atmospheric air when traveling this route passes only through the upper portion of the evaporator unit above the partition wall 58. With the blower fan 43 rotating, this incoming atmospheric air is thus sucked through the blades of the fan and is then discharged centrifugally from said fan into the interior of the fan housing 36 and thence through the discharge nozzle 48, from whence it travels through the branch conduits 46 and 47 to the ultimate discharge openings 49 which may be formed in the instrument panel stamping 51. Louver means 49a may be provided at the instrument panel discharge openings and may be manually operated for directing the ultimate discharge of air as desired. The louver device 49a may be in the form of a cap which is mounted over a discharge nozzle 50 which nozzle is fixed to the instrument panel. The nozzle may have a circular bead 50a formed in its interior; spring clips 49b which are secured to the underneath periphery of the cap serve to anchor the cap relative to the nozzle but permit the cap to be rotated 360° about the axis of the nozzle. The louver blades in the cap are directed at an angle inclined from the axis of the nozzle so that when the cap is rotated the air which is discharged through the nozzle may be directed, for example, against the windshield as shown in Figure 2, or toward the passengers or as otherwise desired. It is important to note that when the system is being utilized for heating the passenger compartment, the cap can be rotated (as indicated by the left cap in Fig. 1) so that the louver blades direct the discharged air onto the side windows 4a for "de-fogging" purposes.

With the dampers in the position as described above, the apparatus is set for cooling purposes and the refrigerating system is in operation, the refrigerant being circulated through the evaporator unit 23 so that any air passing through the evaporator unit into the passenger compartment of the vehicle is cooled as it passes through said evaporator unit. It will be noted that due to the partition wall 58 only about 25% or 30% of the evaporator unit is being utilized and it is atmospheric air that is passing through this portion of the evaporator unit. This atmospheric air has some water content, and, consequently, causes condensation on the exterior surfaces of the evaporator unit. The lower two-thirds of the evaporator unit which is below the partition wall 58 is utilized in the process of cooling the interior of the vehicle by means of a "re-circulation" condition, that is, with the blower fan rotating, the air which is already inside of the passenger compartment and which has already been cooled considerably below the temperature of the atmospheric air, is drawn through opening 41 which is formed in the floor of housing 21. This opening 41, when the apparatus is being used for cooling purposes, functions as an air inlet opening in that the air which is within the passenger compartment of the vehicle is sucked through this opening as indicated by arrows 44 and is thence drawn through the lower two-thirds of the evaporator unit and thence into the blower housing 36, where it is mixed with the incoming atmospheric air which has passed through the upper portion of the evaporator unit and the resultant mixture is thence discharged out through the instrument panel openings 49 or 50. This air which is continuously re-circulated through the lower portion of the evaporator unit and thence into the passenger compartment and then back again through opening 41 usually has some water content and thus there is some condensation on the lower two-thirds of the evaporator unit also. It has been found that by utilizing about 25% or 30% of fresh atmospheric air which is added to the "re-circulated" air, that the air within the passenger compartment is maintained adequately fresh and odors from cigarette smoke, etc. are satisfactorily dispensed with.

When damper 52b is resting in the position as shown in Figure 2 and damper 52a is swung over against damper 52b, as shown in dotted lines in Figure 2, then the apparatus is being utilized for heating the passenger compartment of the vehicle. With the dampers in this position and the vehicle moving forwardly the incoming ram atmospheric air enters opening 5 and travels through openings 14 and thence through openings 18, then through the filtering unit 28, thence through the heat radiating core 30 where the atmospheric air becomes heated and is then discharged through openings 41, 49 and 50 into the passenger compartment of the vehicle. The forward movement of the vehicle is normally sufficient to cause the air to become pressurized so that the amount of air which is discharged through openings 41, 49 and 50 is sufficient to heat the passenger compartment of the vehicle. However, if it is desired to direct an additional quantity of heated air, for example, against the windshield or out through the front wall of the instrument panel through openings 50, or if the vehicle is standing still and one desires to heat the passenger compartment thereof, then it is only necessary to turn the blower fan on and the fan will draw the air through the heat radiating core and thence through the lower two-thirds of the evaporator unit (it being understood, of course, that the refrigerating system is not in operation when the heat radiating core is being utilized) and thence through the fan housing 36, from whence the heated air is ultimately discharged out through the instrument panel openings. When the vehicle is moving forwardly and the fan is being rotated, the forward movement of the vehicle may force some of the heated air out through the discharge opening 41 and the fan will draw the balance of the heated air into the fan housing and thence out through the instrument panel openings. The course of travel of the heated air when the vehicle is moving and when the fan is rotating depends on the speed of the vehicle and also the speed at which the fan is being operated. When the vehicle is standing still and the blower fan is in operation then all of the heated air will be drawn into the fan housing and thence out through the instrument panel opening. When the weather outside of the vehicle is such that the driver of the vehicle does not desire to operate either the heating portion of the apparatus or the cooling portion of the apparatus and at the same time desires to cut off the flow of air into the passenger compartment, then the dampers 52a and 52b may be swung into the respective positions as shown in Figure 2 wherein both of the air routes are closed off and the atmospheric air coming through opening 5 travels as far as the inside faces of both of the dampers but is prevented from traveling into the passenger compartment of the vehicle.

In some instances it may be desirable to bring the two dampers together, each in a generally vertical position, wherein the incoming atmospheric air may travel through opening 18, then through the upper portion 23 of the evaporator unit and also through the filter 28 and thence through the heating core and the lower portion of the evaporator unit and/or through openings 41, 49 and 50 depending on the movement of the vehicle and the activation or de-activation of the blower.

Each damper may be provided with a sealing strip 52c extending along its longitudinal margin for engagement with the longitudinal edge of opening 18 to efficiently close off the respective air routes as desired.

The blower fan 43 is of the centrifugal type and is housed within a compartment 36 immediately in front of said evaporator and in the occupant's side of the vehicle. This compartment consists of a casing which may be secured to the end face of housing 21 by means of bolts 22. A collar 39 is secured to the casing 36 in any suitable manner. The collar 39 serves as a support for the motor 42, which drives the blower 43. A manually operated switch 42a may be provided to operate the motor when desired.

Figure 4:
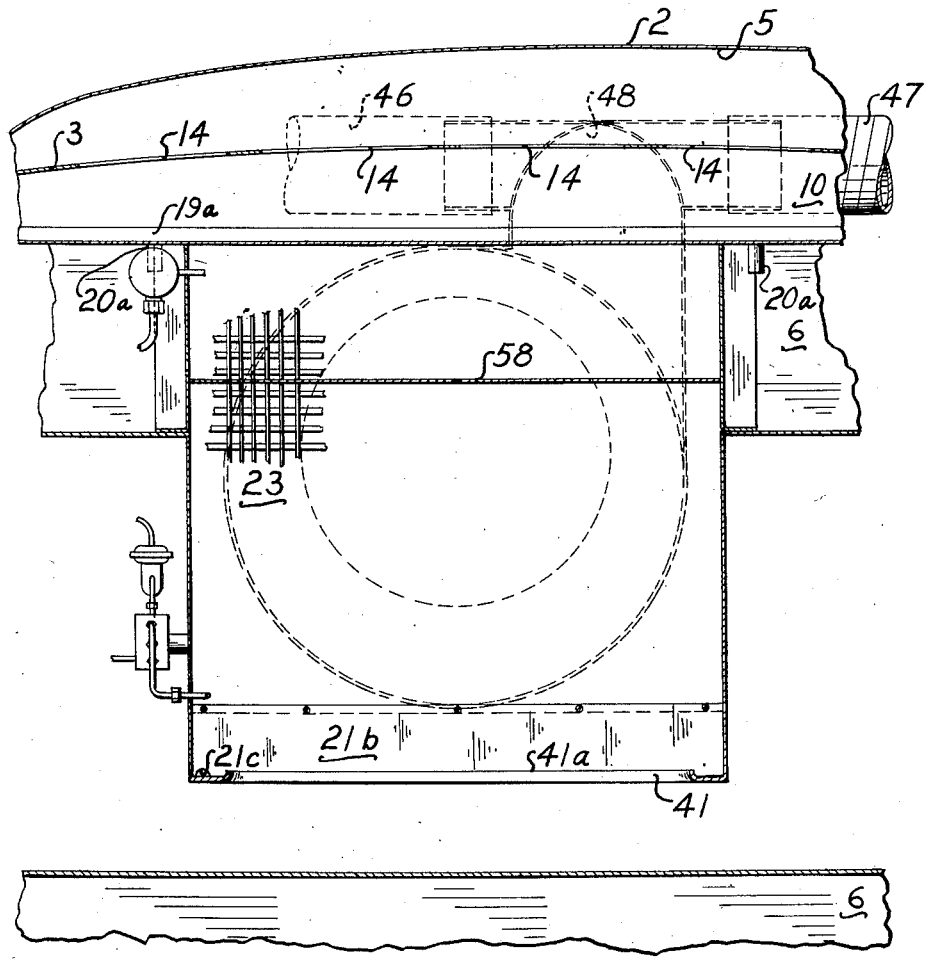
Figure 4 is a fragmentary detail view taken on the line 4—4 of Figure 2.

The casing 21 may be provided with an outwardly flared circular discharge nozzle portion 21a which is axially aligned with the blower fan and the perimeter of which is closely spaced to and in registry with the end face of the blower fan. The floor 21a of casing 21 may be inclined toward the engine compartment and functions to drain the moisture which accumulates on the evaporator unit 23 due to condensation. The baffle plate 21b which spans the full width of the casing 21 and which prevents the air from traveling beneath the evaporator 23 may be provided with an opening 21c (see Figure 4) at one end to permit the moisture to escape past the baffle plate from whence it may be eventually discharged through a drain pipe 21d which has its free end projecting through the dash panel 6 into the engine compartment of the vehicle. The opening 41 may have an upwardly projected flange 41a about its entire perimeter to prevent the drainage water from dropping into the passenger compartment.

The refrigeration system as a whole will function in a conventional manner for the purpose of supplying refrigerant to the evaporator. We provide a compressor C provided with a driven shaft 60 having a magnetic clutch pulley 61 secured to and adjacent its free end. This clutch 61 is driven by a two-step pulley 62 by means of a driven belt 63. The magnetic clutch 61 is arranged with said pulleys and compressor C whereby the two-step pulley may be disconnected so that it is not necessary to take off the belt in the winter time when the cooling system is not in operation. Crank shaft pulley 64 drives the two-step pulley by means of belt 65. As the crank-shaft is rotated by actuation of the automobile engine, the actuation of the compressor is initiated. The compressor runs whenever the automobile engine is running. The compression system consists primarily of the evaporator, the compressor, a condenser, a receiver and a means of controlling the flow of the refrigerant, in this case, the expansion valve. The refrigerant in the evaporator absorbs heat from the air that is being cooled because the refrigerant is held under a pressure at which its boiling temperature is below the temperature of the surrounding air. The heat flowing into the refrigerant from the surrounding air causes the refrigerant to boil, and, therefore, to be converted into a vapor. The vapor then goes back to the compressor where it is compressed to a pressure at which the temperature of the refrigerant is somewhat higher than the cooling air across the condenser. At the condenser the heat is transferred from the refrigerant vapor to the cooling air (ram air in front the car flowing across the condenser) causing the refrigerant to condense, thus the heat extracted from the air being cooled in the passenger compartment is ultimately transferred to the condenser cooling air. The liquified refrigerant is forced under pressure to the receiver and then to the evaporator where the flow controlling device reduces the pressure and the refrigerant again boils, extracting more heat from the surrounding air.

A temperature control 69 comprises a solenoid valve connected between a line 70 connected in the low pressure line 71 and line 72 connected to the condensor 67. There is one switch for the cooling system and one switch for the heating system. In this particular arrangement we provide the magnetic clutch to which the circuit is closed when the blower motor is in operation. The magnetic clutch energizes the solenoid valve. This is the normal arrangement when the cooling system is operating. When the solenoid valve is de-energized, the by-pass condition exists. A thermostatically responsive switch 69a mounted within the passenger compartment is the one which opens or closes the circuit to the magnetic clutch and energizes or de-energizes the solenoid valve 69 in accordance with a pre-selected temperature setting at the switch. When the temperature within the passenger compartment is lowered to the selected temperature, the solenoid valve is actuated to cause the refrigerant to be by-passed in the conventional manner to prevent the refrigerant from traveling through the evaporator unit.

The refrigeration system thus has provided an evaporator unit which is readily arranged alongside of a heating core in a unitary structure primarily to save expense and to provide a combination structure which is available for heating or cooling a vehicle under the ordinary driving conditions found in the summer or winter seasons.

It is evident that various modifications, substitutions, eliminations, and additions may be resorted to without departing from the broad spirit and scope of our invention, and hence, we do not desire or intend to limit the invention in all respects to the exact disclosures of the specific example herein presented except as may be required by specific intended limitations thereto in certain of the claims hereto appended.

We claim:

1. An air conditioning device for an automotive vehicle having a passenger compartment and an engine compartment comprising: a partition panel separating the engine compartment from the passenger compartment and having a large opening therein; an air reception compartment arranged adjacent the partition panel and having a first opening communicating with the atmosphere; a heat radiating core mounted adjacent the air reception compartment; a housing surrounding the heat radiating core and being spaced therefrom to provide a first passage ahead of said core, said housing being mounted within the panel opening; said air reception compartment having a second opening therein in communication with the first passage; a refrigerant handling core positioned within the housing and supported adjacent the partition panel and disposed substantially in alignment with, rearwardly of and spaced from the heat radiating core, thereby providing a second passage between said cores; a partition wall separating the upper portion of the refrigerant handling core from the lower portion thereof and defining in conjunction with the underside of the air reception compartment a third passage, the partition wall closing off the third passage from the second passage; valve means mounted between the air reception compartment and the cores for selectively closing off communication between the interior of the air reception compartment and the first and second passages, such valve means also being operable for closing off the third passage from communication with the interior of the air reception compartment said housing having a first opening establishing communication between the interior of the housing and the passenger compartment and a second opening separate from the first housing opening and also establishing communication between the interior of the housing and the passenger compartment and a power operated blower mounted adjacent the partition panel and when activated for inducing atmospheric air to flow through the air reception compartment, first passage, heat radiating core, second passage and then the lower portion of the refrigerant handling core whenever the third passage is closed off by the valve means and said blower when activated and when the first passage is closed off by the valve means serving to induce atmospheric air to flow through the air reception compartment, third passage, upper portion of the refrigerant handling core and into the passenger compartment through the first housing opening and at the same time inducing air to travel from the passenger compartment into the housing through the second housing opening, then through the second passage, then through the lower portion of the refrigerant handling core and back into the passenger compartment through the first housing opening.

2. In an automotive vehicle having a closed passenger compartment and an engine compartment adjacent to the passenger compartment, an air treatment apparatus comprising: a large wall panel separating the engine compartment from the passenger compartment and having an opening therein; a housing mounted on the wall panel in the opening thereof and being enclosed so as to serve for directing the transfer of air from the engine compartment side of the wall panel to the passenger compartment side of said panel; a heat radiating core mounted in the housing and having air passages therethrough; a refrigerating core mounted in the housing and having air passages therethrough; means for activating the heating core to radiate heat therefrom; means for activating the refrigerating core for cooling the surrounding air; said cores being arranged so that pressurized air may flow successively through said cores; said housing having a first opening to establish communication between the interior of the housing and the atmosphere, a second opening for establishing communication between the interior of the housing and the passenger compartment, and a third opening separate from the second opening and establishing communication between the interior of the housing and the passenger compartment; a power operated blower for inducing flow of air entering the first housing opening to travel through the housing and on into the passenger compartment; said third housing opening functioning to discharge air from the interior of the housing into the passenger compartment during deactivation of the blower and activation of the heating core and functioning to admit air into the housing from the passenger compartment during activation of the blower and the refrigerating core.

3. Apparatus as set forth in claim 2 wherein the rear face of the heat radiating core is spaced from and exposed to the front face of the refrigerating core, thereby providing between said cores an air transfer passage for establishing direct communication between the third housing opening and the front face of the refrigerating core.

4. In an automotive vehicle having a closed passenger compartment and an engine compartment adjacent to the passenger compartment, an air treatment apparatus comprising: a large wall panel separating the engine compartment from the passenger compartment and having an opening therethrough; a housing mounted on the wall panel in the opening; a heat radiating core having air passages therethrough and a refrigerating core having air passages therethrough, both cores being positioned within the housing; means for activating the heating core to radiate heat therefrom; means for activating the refrigerating core independently of the activation of the heating core for absorbing heat from the surrounding air; said housing having a first opening establishing communication between the interior of the housing and the atmosphere; said housing defining a first passage communicating with the first opening and with the heat radiating core at the forward face thereof; said cores being mounted and arranged within the housing so that pressurized air entering the first housing opening may travel in a continuous path through the cores successively; said housing having a second opening therein for establishing communicating between the passenger compartment and the interior of the housing whereby to discharge the pressurized air from the housing into the passenger compartment; said housing having a third opening separate from the first and second openings therein for establishing communication between the interior of the housing and the passenger compartment; a power operated blower mounted relative to the housing for inducing the air within the housing to be discharged into the passenger compartment; said first opening in the housing being adapted to permit entry of air from the exterior of the passenger compartment and such air on forward movement of the vehicle being induced to flow into the passenger compartment by being discharged through the second and third housing openings; said third housing opening during deactivation of the blower and activation of the heating core and during forward movement of the vehicle serving as a discharge opening for discharging air from the interior of the housing into the passenger compartment and said third opening during activation of the refrigerating core and during operation of the blower serving as an inlet opening for permitting flow of air from the passenger compartment into the interior of the housnig, then through the refrigerating core and then through the second housing opening back into the passenger compartment.

5. Apparatus as set forth in claim 4 wherein the cores are arranged in face to face fashion and spaced from each other to define a second passage located between the cores, said second passage being in communication with the third housing opening, whereby when the third opening is functioning to permit entry of air from the passenger compartment into the housing such air travels through the refrigerating core only before being discharged through the second housing opening into the passenger compartment.

References Cited in the file of this patent

UNITED STATES PATENTS

| | | |
|---|---|---|
| Re. 20,469 | Crawford | Aug. 17, 1937 |
| 1,821,297 | Driscoll | Sept. 1, 1931 |
| 2,094,221 | Shaller | Sept. 28, 1937 |
| 2,173,961 | Craft | Sept. 26, 1939 |
| 2,187,982 | Moncrief | Jan. 23, 1940 |
| 2,264,848 | Kahl | Dec. 2, 1941 |
| 2,331,691 | Hubbard | Oct. 12, 1943 |
| 2,341,781 | Hornaday | Feb. 15, 1944 |
| 2,647,451 | Aufiero | Aug. 4, 1953 |